Jan. 25, 1938. J. M. HOTHERSALL 2,106,175

BAIL CONTAINER

Filed Sept. 8, 1933

INVENTOR
John M. Hothersall
BY Ivan D. Thornburgh
Charles H. Cline
ATTORNEYS

Patented Jan. 25, 1938

2,106,175

UNITED STATES PATENT OFFICE 2,106,175

BAIL CONTAINER

John M. Hothersall, Brooklyn, N. Y., assignor to American Can Company, New York, N. Y., a corporation of New Jersey Application September 8, 1933, Serial No. 688,675

1 Claim. (Cl. 220—91)

The present invention relates in general to bail containers or cans and has for an object the provision of a container having an attached bail and bail ears in which the bail is pivotally mounted, the bail being movable into container carrying or into non-carrying positions, the bail in the latter positions being supported by stop elements associated with the bail ears which hold it spaced from the side wall of the container.

An important object of the invention is the provision of a container of the character described which embodies bail ears into which the ends of a bail are easily inserted and from which the inserted bail cannot become displaced, the bail ears being formed to prevent the bail from engaging the side wall of the container at any time.

A further object of the invention is the provision of bail ears for a bail container one or both of which cooperate with the bail to hold it in either one of two non-carrying positions with the bail spaced from the container wall.

Numerous other objects and advantages of the invention will be apparent as it is better understood from the following description, which, taken in connection with the accompanying drawing, discloses a preferred embodiment thereof.

Referring to the drawing.

Figure 1:
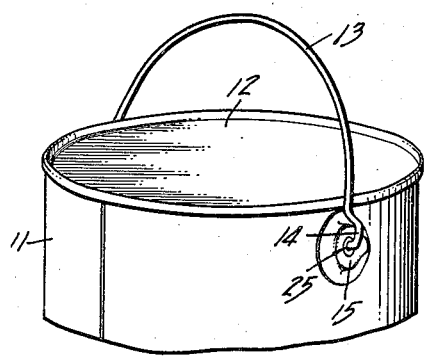
Figure 1 is a perspective view of the upper part of a bail container or can embodying the present invention and illustrating its assembled bail in container carrying position.

For the purpose of exemplifying the present invention there is shown in the drawing a bail container or can comprising a can body 11 having a suitable top end 12 secured thereto. A bail 13 is provided for carrying the can and is preferably formed with looped ends 14 (Fig. 1) which are pivotally connected with bail ears 15. These bail ears may be permanently secured on opposite sides of the body 11 in any suitable manner as by soldering.

Each looped end 14 of the bail 13 (Fig. 6) is bent at 16 into an outwardly extending part which is again bent at 17 where it merges into a section 18 substantially parallel to the sides of the bail. Each section 18 is bent inwardly in a short end piece forming a pivot 19, the two pivotal end pieces extending in the same plane and projecting toward the center of the can when assembled with the can. The end parts 19 of the bail provide the carrying sections for supporting the can and constitute the pivotal part of the bail in its sockets within the bail ears 15.

Figure 3:
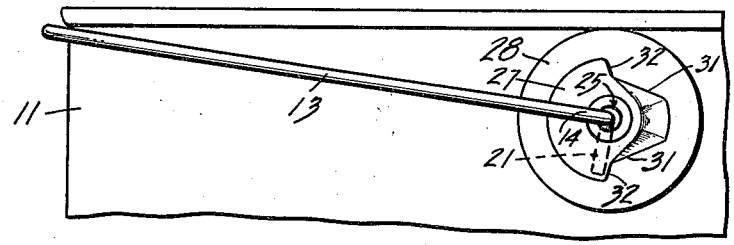
Fig. 3 is an enlarged side view of the upper part of the can illustrating its bail in a non-carrying position.
Figure 4:
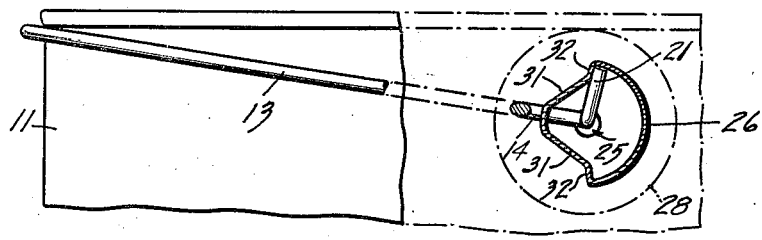
Fig. 4 is a composite view being partly a side elevation similar to Fig. 3 and partly a sectional view taken through the opposite bail ear, the plane of section of the latter being substantially that indicated by the lines 4—4 in Fig. 2.
Figure 6:
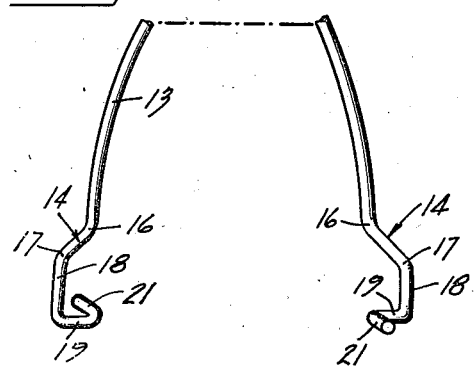
Fig. 6 is a perspective view of the two ends of the bail, the center part of the bail being broken away.

Each end part 19 is further bent into an extremity 21, one being bent toward the right and the other toward the left, as illustrated in Fig. 6. Both or either one of these parts 21 forms a stop to hold the bail from turning down too far (Figs. 3 and 4). This is a type of bail which has been used in the industry for some time being the same bail as is disclosed in the Egenolf Patent No. 1,646,856. The Egenolf bail is adapted to be engaged within its bail ears by having one end first inserted into a pivot opening in one of the ears after which the opposite end of the bail is snapped into the pivot opening of the opposite bail ear.

Bail 13 is also adapted in like manner for assembly with the bail ears 15 and each ear is accordingly formed with a pivot opening 25 for this purpose. By reason of the right and left bent extremities 21 of the bail ends the bail cannot be taken out of the bail ears after such insertion and assembly.

Each bail ear 15 is of bendable sheet metal and comprises a hollow cylindrical body 26 of cup shape having an outer face or wall 27 in which the opening 25 is formed and is also provided with a surrounding flange 28 which provides the engaging part of the ear in its connection with the wall of the can body. The wall of the cylindrical body part 26 of each bail ear is also pressed in or indented or bent at 31 to provide two stop shoulders 32 for a purpose now to be described.

Each bail ear 15 is applied to the wall of the container body 11 with its pressed in parts 31 extending toward the right (Figs. 3 and 5) as viewed from the front. It will be observed, by comparing Figs. 5 and 4, that by disposing the ears in this position on the can the pressed in parts 31 of the ear on the opposite side extends toward the left if viewed from the near or adjacent ear and looking through the can. Such a positioning is desirable to adapt the ears to the right and left bends of the extremities 21 of the bail so that the stop shoulders will properly function.

Figure 2:
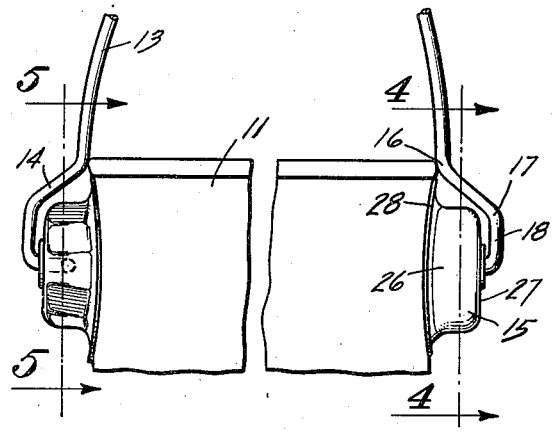
Fig. 2 is an enlarged fragmentary front elevation of the same.

When the bail 13 is in carrying position (Figs. 1 and 2) the extremities 21 of the bail ends 14 are disposed midway between and out of engagement with the stop shoulders 32 being enclosed within the cylindrical wall part 26. The bail at such time is in vertical position.

The bail may be moved either way from such vertical position, its end pivoting within its pivot openings 25 and the bail moving into one of two non-carrying positions, one of these a left hand position being illustrated in Figs. 3 and 4. The extremity 21 of the adjacent or near bail end 14 now rests against the lower stop shoulder 32 of the adjacent ear (Fig. 3). The opposite bail extremity 21 which is in the bail ear on the opposite side of the body strikes against and is held by the upper stop shoulder 32 of the opposite ear, as shown in Fig. 4.

This engagement of the bail end extremities with the stop shoulders of the bail ears holds the bail along side of but spaced from the wall of the can body and prevents the bail striking against the can wall. In such a held position the bail is conveniently located in easy grasp when the can is to be lifted. The side wall of the can is also protected against scratching by the bail which might otherwise occur if it struck against the wall.

Figure 5:
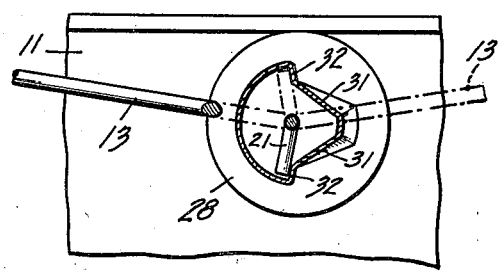
Fig. 5 is a fragmentary side elevation of the can and a sectional view of the near or front bail ear and the adjacent end of the bail, being substantially that as viewed along the line 5—5 in Fig. 2.

The bail 13 may also be supported in its second non-carrying position on the opposite side of the can as indicated by the dot-and-dash line extending out toward the right as shown in Fig. 5. In this position the support of the bail ends is reversed and the extremity 21 of the near end of the bail strikes against the upper stop shoulder 32 of the adjacent ear and its opposite end against the lower stop shoulder of the opposite ear.

By means of this construction the bail is supported in either of its non-carrying positions and is prevented from engaging the can wall by having both of its end extremities engaged as just described. A single end support of the bail may in some instances be sufficient and where this condition is desired only one of the bail ears need be formed with stop shoulders 32, the other ear in such a case having a plain, full cylindrical body 26 without the pressed in walls 31.

The same single support may also be provided by using two bail ears each having but a single stop shoulder 32. In such a fancied construction one ear would function for one non-carrying position and the other ear for the second or opposite non-carrying position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

A container comprising a body, cup-shaped hollow bail ears formed of bendable sheet metal, each including a peripheral wall permanently secured to said body, and a one-piece bail having hooked ends adapted for insertion within and pivotal engagement with said ears, the peripheral wall of the bail ear including an arcuate portion of substantial length, the portions of the peripheral wall at the opposite ends of said arcuate portion being bent inwardly to form stop shoulders for engaging said bail ends to hold the bail spaced away from the wall of the container body, the hooked shoulder engaging portions of said bail normally extending transversely of the bail within the hollow bail ears, whereby said bail ends may be inserted within said hollow bail ears by a twisting movement of the bail.

JOHN M. HOTHERSALL.